United States Patent Office
3,201,389
Patented Aug. 17, 1965

3,201,389
METHOD FOR PREPARING RIBONUCLEOSIDE-5'-PHOSPHATES OR THEIR SALTS FROM RIBONUCLEOSIDES
Yasuo Fujimoto, Machida-shi, and Masao Naruse, Tokyo, Japan, assignors to Kyowa Hakko Kogyo Co., Ltd., Tokyo, Japan, a corporation of Japan
No Drawing. Filed Sept. 23, 1963, Ser. No. 310,879
Claims priority, application Japan, Sept. 24, 1962, 37/41,062, 37/41,063, 37/41,064, 37/41,065; May 14, 1963, 38/24,065, 38/24,066; May 31, 1963, 38/27,753, 38/27,752
19 Claims. (Cl. 260—211.5)

The present invention relates to a novel method of preparing ribonucleoside-5'-phosphates or their salts. In the present invention, an acidic phosphomonoester represented by the general formula:

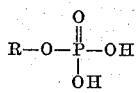

wherein R represents an aliphatic, alicyclic, or aromatic hydrocarbon radical including those having substituent (or substituents) and those having substituted or unsubstituted aliphatic, alicyclic or aromatic hydrocarbon radical (or radicals) as a side chain (or side chains); a phosphorus-containing compound represented by the general formula:

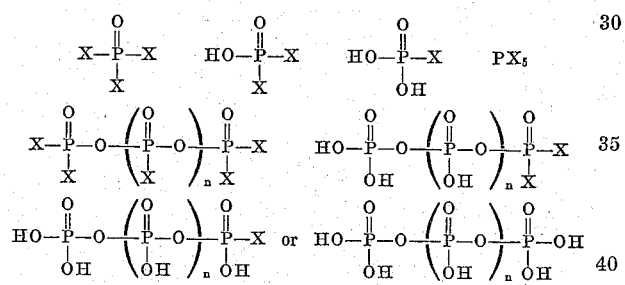

wherein X represents a halogen, and $n$ represents an integer selected from 0, 1, 2, 3, etc.; metaphosphoric acid; orthophosphoric acid; phosphorous pentoxide; or a mixture consisting of two or more of said compounds in any desired proportion is used as a catalyst, ribonucleoside is reacted with an aliphatic, alicyclic, or aromatic carbonyl compound represented by the general formula:

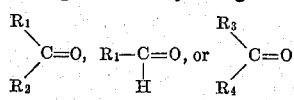

wherein $R_1$ and $R_2$ represent the same or different aliphatic, alicyclic, or aromatic hydrocarbon radical including those having substituent (or substituents), and those having substituted or unsubstituted aliphatic, alicyclic, or aromatic hydrocarbon radical (or radicals) as a side chain (or side chains), and $R_3$ and $R_4$ represent the same or different aliphatic hydrocarbon radical including those having substituent (or substituents) and those having substituted or unsubstituted aliphatic, alicyclic, or aromatic hydrocarbon radical (or radicals) as a side chain (or side chains) to give 2'3'-O-substituted ribonucleoside represented by the general formula:

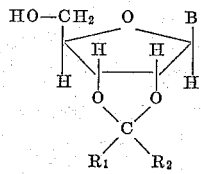 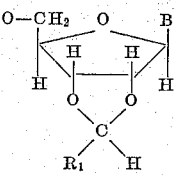

or

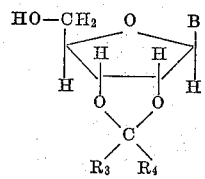

wherein B represents an organic base such as pyridines, pyrimidines and purines, and $R_1$, $R_2$, $R_3$, and $R_4$ are the same as defined above, for example, 2',3'-O-alkylideneribonucleoside, and then the phosphorylating reaction at 5'-OH of the ribonucleoside is carried out without isolating the 2',3'-O-substituted ribonucleoside or without removing the catalyst used in the 2',3'-O-substitution reaction. As known well, ribonucleoside-5'-phosphates have been used as a starting material for the synthesis of nucleotide coenzymes or a seasoning substance. General methods used for the synthesis of said 5'-ribonucleotides (ribonucleoside-5'-phosphates) are divided into the following two types.

(1) As shown in the following scheme, ribonucleoside is allowed to react with acetone in the presence of an acidic catalyst to produce 2',3'-O-isopropylideneribonucleoside, thus protecting OH groups at 2' and 3' positions of ribose

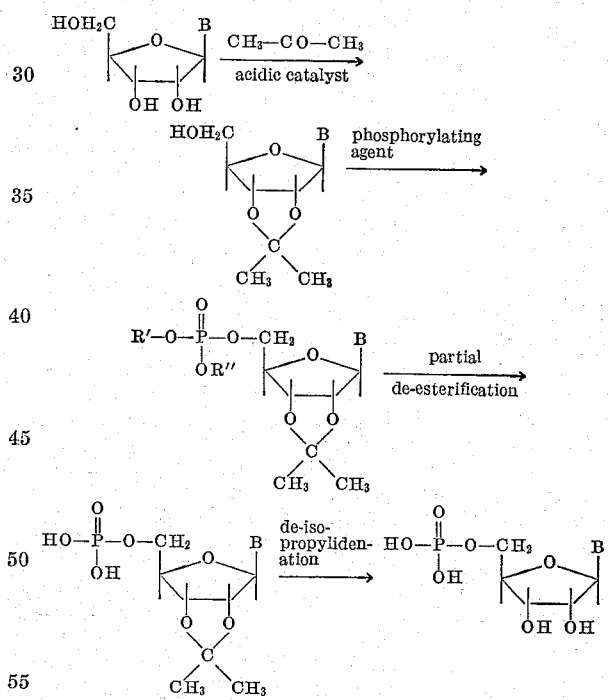

(wherein B represents an organic base such as pyridines, pyrimidines, and purines, and R' and R" represent hydrogen atom or ester residue) which is one constituent of the ribonucleoside. The ribonucleoside-5'-phosphate is obtained by phosphorylation of the hydroxyl group at 5' position with a phosphorylating agent followed by removal of the protecting groups with various treatments. In the same procedure as described above, benzylidenation may be used instead of isopropylidenation. The 2',3'-O-isopropylident derivatives have been prepared by heating vacuum-dried ribonucleosides in anhydrous acetone in the presence of acidic catalyst such as completely dehydrated zinc chloride, p-toluenesulfonic acid, and copper sulfate. However, this method has certain disadvantages that the yields are low depending on the kinds of nucleosides used and it is necessary in the synthesis of the nucleoside-5'-phosphate by the phosphorylation of the 2',3'-O-ispropylidene derivative, to remove completely the acidic catalysts used, because such acidic catalysts are usually harmful to the phosphorylating reaction. Using various acidic phosphomonoesters, we have extensively studied the role of the phosphomonoesters as the acidic catalyzer in the 2',3'-O-substitution of ribonucleosides with various carbonyl compounds and their reuse as the phosphorylating agent in the phosphorylation of the 2',3'-O-substituted ribonucleosides. As a result, we have found that the acidic phosphomonoesters represented by the general formula:

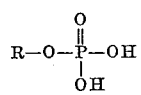

wherein R is the same as defined above, catalyze the dehydrating condensation of the ribonucleoside with acetone. Surprisingly, we have further discovered that they also have a catalytic action in 2',3'-O-benzylidenation of ribonucleosides. Starting from these interesting facts, we have further advanced the studies in the 2',3'-O-substitution and discovered that acidic phosphomonoesters can generally be used as the catalyst not only in isopropylidenation and benzylidenation, but also in the dehydrating condensation reactions of the 2'-OH and 3'-OH of the ribonucleosides with various carbonyl compounds at 2'-OH and 3'-OH to give the 2',3'-O-substituted ribonucleosides in good yields. Thus, we have invented a commercially advantageous process for the synthesis of ribonucleoside-5'-phosphoric acids or their salts in which the isolation of the 2',3'-O-substituted ribonucleoside in pure state or the removal of the catalyst used in the 2',3'-O-substitution from the reaction system after the substitution is not necessary, only the removal of the solvent from the reaction system is necessary for the following phosphorylation, and the phosphomonoester uesd as the catalyst in the 2',3'-O-substitution can be used again as the phosphorylating agent with only the addition of a suitable condensing agent such as carbodiimides, ketenimides, cyanamides, and nitrils, and a suitable organic amine base including heterocyclic compounds such as pyridines, piperidines, pyrroles, pyrazines, pyrimidines, and morpholines, to phosphorylate the 5'-OH of the ribonucleoside in good yields. As the acidic phosphomonoesters used as the catalyst in the 2',3'-O-substitution do not interfere with the phosphorylating reaction of the 2',3'-O-substitution ribonucleoside by other phosphorylating agents, these phosphorylating agents may be added after the 2',3'-O-substitution.

We have further carried out similar investigations using various phosphorus-containing compounds other than phosphomonoesters and various carbonyl compounds. Consequently, we have found the commercially advantageous process for the synthesis of ribonucleoside-5'-phosphates in which metaphosphoric acid, orthophosphoric acid, phosphorus pentoxide, and phosphorus-containing compounds represented by the general formulas:

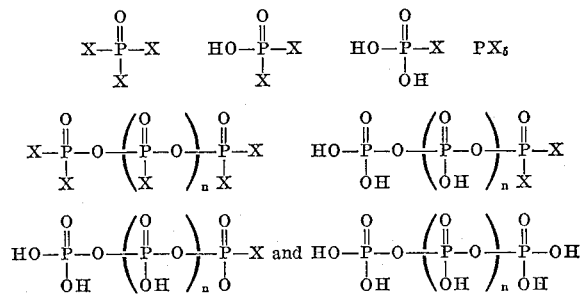

wherein X represents halogen, and $n$ represents an integer selected from a group of 0, 1, 2, 3 etc., and a mixture comprising two or more said compounds in any desired proportion is used as a catalyst similarly as said phosphomonoesters in the condensation reaction of 2'-OH and 3'-OH of ribonucleoside with aliphatic, alicyclic, or aromatic carbonyl compounds to give the 2',5'-O-substituted ribonucleoside in good yields, the isolation of the 2',3'-O-substituted ribonucleoside or the removal of the catalyst used in the 2',3'-O-substitution from the reaction system after the substitution is not necessary for the following phosphorylation, and the phosphorus-containing compounds including metaphosphoric acid, orthophosphoric acid, phosphorus pentoxide, and their mixtures used as the catalyst in the substitution can be used again as the phosphorylating agent to phosphorylate the 5'-OH of the ribonucleoside in good yields with or without the removal of the solvent used in the substitution from the reaction system after the substitution, with or without the addition of the above-described suitable condensing agent such as carbodiimides, ketenimides, cyanamides, and nitriles (in general, the condensing agent need not be added when halogenated phosphorus-containing compounds are used as the catalyst), with or without the addition of the suitable organic amine base including heterocyclic compounds such as pyridines, piperidines, pyrroles, pyrazines, pyridazines, pyrimidines, and morpholines, and by maintaining the reaction mixtures at a suitable temperature, usually from −30° C. to 50° C.

In the 2',3'-O-substitution, the solvents such as alcohols, ethers like methyl Cellosolve, formamides, nitriles, dioxanes, and chloroform may be added in the reaction system as the medium to make the system homogeneous. The solvent, however, is not always necessary, and the reaction will proceed even in the heterogeneous system, if enough stirring is carried out. It is desirable to maintain the reaction temperature at a lower temperature than room temperature when phosphorus halide or phosphoryl halide is employed.

It has heretofore been disclosed by one of us that if a compound capable of removing water from the reaction system by reacting with water to form alcohols, esters, ketones or aldehydes, is added as dehydrating agent in the 2',3'-O-substitution reaction, it is not necessary to dry up completely the starting material and catalyst employed in the reaction, and ordinary commercial products may be used. Among these compounds are mentioned compounds having double bond conjugated with carbonyl radical such as mesityl oxide, compounds having triple bond such as diphenylacetylene, compounds having alkoxyl radical and double bond on the same carbon atom such as 2-methoxypropylene, compounds having two alkoxy group on the same carbon atom such as acetals (for example, acetal) and ketals (for example, 2,2-diethoxypropane), cyclic ethers such as ethylene oxide, and orthoesters such as ethyl orthoformate.

Next, the process of the present invention will be briefly described below.

To a suitable amount, usually 1 to 50 l. (or 1 to 50 kg.) of an aliphatic, alicyclic, or aromatic carbonyl compound represented by the general formula:

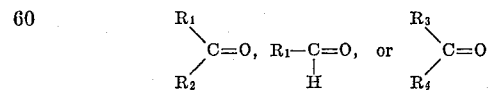

wherein $R_1$, $R_2$, $R_3$, and $R_4$ are the same as defined above (if the compound is solid, it is dissolved with a suitable solvent such as alcohols, Cellosolves, N-substituted formamides, nitriles, dioxanes, and chloroform) are added, with stirring, one equivalent of ribonucleoside and an adequate amount, usually 0.5 to 10 moles of acidic phosphomonoester or phosphorus-containing compound including a mixture of the compounds as a catalyst (the catalyst may be added into the reaction system after dissolving with a suitable solvent such as alcohols, Cellosolves, N-substituted formamides, nitriles, dioxanes, and chloroform). The 2',3'-O-substitution is accomplished by further addition of an adequate amount, usually 0 to 20 moles, of the water-reactive compound described above (the order of addition may not always be the order described), and stirring at a desirable temperature (usually below the refluxing temperature of the reaction medium) for enough time, usually quarter-hour to several days, with exclusion of external moisture. For the phosphorylation of the 2′,3′-O-substituted ribonucleoside formed is used the reaction mixture itself without the isolation of the ribonucleoside from the mixture, or the residue obtained by evaporating the solvent from the mixture under reduced pressure. If the addition of base is necessary in the phosphorylation, an adequate amount of the base may be added gradually at a desirable temperature, usually from −30° C. to 50° C., prior to drying the mixture under reduced pressure. The phosphorylation step is carried out as follows. Using the phosphomonoester as the catalyst, the residue may be completely dehydrated by a suitable method, for example, by repeating several times the dehydration procedure using azeotropic distillation of a solvent with water. The residue is dissolved in dioxanes or pyridines and then evaporated to dryness under reduced pressure. After repeating several times the dehydration procedure, the residue is dissolved with stirring by adding an adequate amount, usually 5 to 50 l., of a suitable solvent, for example, formamides, nitriles, dioxanes, and liquid organic amine bases including heterocyclic compounds such as pyridines, piperidines, pyrroles, pyrazines, pyridazines, pyrimidines, and morpholines. An adequate amount, usually 1 to 10 times the equivalent of phosphomonoester used, of a suitable organic base is added, if desired, and then an adequate amount, usually 1 to 10 times the equivalent of phosphomonoester used, of a suitable condensing agent such as carbodiimides, ketenimides, cyanamides, and nitriles is added with or without dissolving it in a suitable solvent. The mixture is stirred or allowed to stand at a desirable temperature (usually 0 to 80° C.) for enough time (usually 0.5 hour to several days), and then a small amount of water is added to terminate the reaction and the mixture is allowed to stand at room temperature for about one hour. In this step of the process, primary reaction products are present in the reaction mixture as the phosphodiesters represented by the general formula:

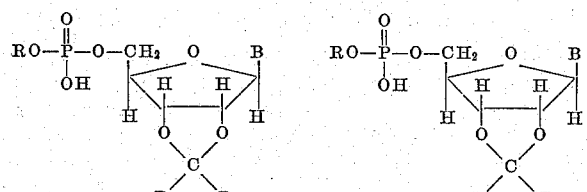

or

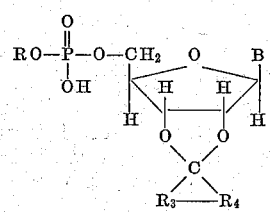

wherein B, $R_1$, $R_2$, $R_3$, and $R_4$ are the same as defined before.

Using the phosphorus-containing compounds as the catalyst, the residue or reaction mixture is cooled to a desirable temperature, usually from −30° C. to 50° C., and the organic base is gradually dropped in. When certain halogenated phosphorus-containing compounds are used, the organic bases are not always necessary. After the dropwise addition of the base, the mixture is stirred for enough time (0.5 hour to several days), and then an adequate amount of water is added to terminate the reaction and the mixture is allowed to stand at room temperature for about one hour after. In this step of the process, the reaction products are present in the reaction mixture as the phosphomonoesters represented by the general formula:

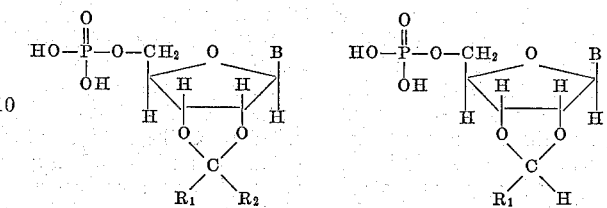

or

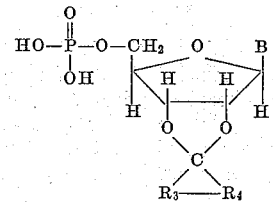

wherein $R_1$, $R_2$, $R_3$ and $R_4$ are the same as defined above. Subsequently, from the reaction mixture the ribonucleoside-5′-phosphoric acid or its salts is obtained by suitable treatments, for example, the treatment consisting of the suitable combination of two procedures: one is the conversion of the reaction product to the desired ribonucleoside-5′-phosphate such as a removal of the ester residue (R) by alkaline hydrolysis or catalytic hydrogenation using platinum or palladium catalyst which is described in Biochemical Preparation, 2, 39 (1949) or 5, 66 (1957), and a removal of the substituent group protecting 2′-OH and 3′-OH of the ribose part, for example, alkylidene radical or arylalkylidene radical, by acid hydrolysis, and the other is the isolation of the reaction product from the reaction mixture.

The reaction of the present invention may be carried out in a heterogeneous suspension system and a suitable solvent described above may be added on the reaction. When the phosphorylation reaction is performed, other suitable phosphorylating agents may be added.

The following examples are furnished to assist in providing a complete understanding of the present invention, but it is to be understood that the invention is not limited thereto nor to the specific compositions, proportions, and procedures set forth therein, which are given only for purposes of illustration.

*Example 1*

Guanosine (2.83 g.) was suspended in 100 ml. of acetone, and 50 ml. of dimethylformamide containing 10 g. of 2-cyanoethyl dihydrogen phosphate and 15 g. of 2,2-dimethoxypropane were added to the suspension. The mixture was heated under reflux for 20 hours with exclusion of external moisture. After cooling, 100 ml. of anhydrous pyridine was added, and the mixture was dried under reduced pressure. The residue was dehydrated by the dehydration procedure in which after dissolving the residue with anhydrous pyridine the resulting solution was concentrated to dryness under reduced pressure. After repeating three times the dehydration procedure, the residue was dissolved in 100 ml. of anhydrous pyridine, 20 g. of N,N′-dicyclohexylcarbodiimide was added with stirring, and the mixture was allowed to stand at room temperature in a anhydrous state for 48 hours. After adding 200 ml. of water, the mixture was allowed to stand at room temperature for 1 hour, and vacuum-dried, and then 400 ml. of 0.5 N lithium hydroxide was added. The mixture was refluxed 1 hour, and then cooled and filtered. The filtrate was passed through a column (3 cm. in diameter) packed with 500 ml. of hydrogen-type of strongly acidic cation exchange resin, sold under the registered trademark Dowex-50, and the resin was thoroughly washed with water. All the effluents were allowed to stand at room temperature for 3 hours, and concentrated to 500 ml. under reduced pressure after adjusting the pH to 4 with aqueous barium hydroxide. The pH value of the concentrate was adjusted to 7 with barium hydroxide, and the precipitates thus deposited were filtered and washed several times with water to give about 1.5 l. of combined filtrate and washings. Two volumes of ethanol was added into the combined solution, and the precipitates thus deposited were filtered, washed with ethanol, and dried. There was thus obtained 5.35 g. of barium guanosine-5'-phosphate (having 9 molecules of water of crystallization), corresponding to a yield of 81%.

Example 2

The procedure similar to that in Example 1, using 2.68 g. of well-dried inosine, 100 ml. of anhydrous acetone, 13 g. of p-cyanophenyl dihydrogen phosphate and 20 g. of N,N'-dicyclohexylcarbodiimide gave 4.5 g. of barium inosine-5'-phosphate (having 7.5 molecules of water of crystallization), corresponding to a yield of 73%.

Example 3

Barium adenosine-5'-phosphate was obtained by the same procedure as in Example 1 except that ammonia water was used instead of lithium hydroxide, using 2.67 g. of adenosine, 50 ml. of acetone, 10 g. of 2-cyanoethyl dihydrogen phosphate, 50 ml. of dimethylformamide, and 15 g. of 2-methoxypropylene as the starting materials, and 36 g. of trichloroacetonitrile as the condensing agent in the phosphorylation reaction. Barium ion was removed by passing through a column packed with hydrogen-type of Diaion SK #1 cation exchange resin (sold under registered trademark) to give aqueous solution of free adenosine-5'-phosphoric acid, and then the solution was dried up in vacuo. There was thus obtained 3.18 g. (83% yield) of adenosine-5'-phosphoric acid (5'-adenylic acid) (having 2 molecules of water of crystallization).

Example 4

An aqueous solution of uridine-5'-phosphoric acid (5'-uridylic acid) was obtained according to the same procedure as in Example 3, using 2.55 g. of uridine, 50 ml. of acetone, 15 g. of p-nitrophenyl dihydrogen phosphate, and 20 g. of ethyl orthoacetate as the starting materials and 30 g. of dimethylcyanamide as the condensing agent in the phosphroylation step. The required amount of sodium hydroxide solution was added to give the disodium salt solution, and the aqueous disodium salt solution was vacuum-dried. There was thus obtained 1.65 g. (41% yield) of disodium uridine-5'- phosphate (having 2 molecules of water of crystallization).

Example 5

By the same procedure as in Example 3, 1.45 g. (43% yield) of cytidine-5'-phosphoric acid (5'-cytidylic acid) (having one molecule of water of crystallization) was obtained, using 2.43 g. of cytidine, 100 ml. of acetone, 8 g. of 2-cyanoethyldihydrogen phosphate, 50 ml. of dimethylformamide, and 20 g. of 2,2-diethoxypropane as the starting materials, and 30 g. of N-methyl dimethyl ketanimide as the condensing agent in the phosphorylation step.

Example 6

The phosphorylation was performed by the same procedure as in Example 3, using 2.67 g. of adenosine, 100 ml. of acetone, 15 g. of phenyl dihydrogen phosphate, and 10 g. of 2-methoxypropylene as the starting materials, and 15 g. of dicyclohexylcarbodiimide as the condensing agent in the phosphorylation step. The phenyl radical attached to the phosphate radical through an ester linkage was removed by catalytic hydrogenation using platinum or palladium catalyst rather than by alkaline hydrolysis. The isopropylidene radical was removed by heating in HCl-acidic solution, and the acidic solution was neutralized with calcium hydroxide followed by the procedure similar to that in Example 3 to obtain calcium adenosine-5'-phosphate. Calcium ion was removed by treating with hydrogen-type of Amberlite IR 120 cation exchange resin (trade name), and thus 2.49 g. (65% yield) of adenosine-5'-phosphoric acid was obtained.

Example 7

An amount of 2.83 g. of well-dried guanosine, 100 ml. of anhydrous acetone, 10 g. of 2-cyanoethyl dihydrogen phosphate, 50 ml. of anhydrous dimethylformamide, and 10 g. of 2,2-diethoxypropane were refluxed for 10 hours with exclusion of external moisture. Twenty grams of triethylamine was added, then the mixture was dried under reduced pressure. The residue was dissolved in 100 ml. of anydrous dimethylformamide, and 15 g. of dipropylcarbodiimide was added with stirring. The mixture was then worked up as in Example 1. There was thus obtained 4.95 g. (75% yield) of barium guanosine-5'-phosphate (having 9 molecules of water of crystallization).

Example 8

To a suspension of 2.68 g. of inosine in 50 ml. of benzaldehyde, were added with stirring 50 ml. of dimethylformamide containing 10 g. of 2-cyanoethyl dihydrogen phosphate, and 18 g. of 2,2'-diethoxypropane. The mixture was heated with stirring at 70° C. for 10 hours with exclusion of external moisture. After cooling, 200 ml. of anhydrous pyridine was added, and the mixture was dried in vacuo. In order to dehydrate the dried residue, the procedure in which the residue was dissolved with 100 ml. of anhydrous pyridine and dried in vacuo, was repeated 3 times. After the dehydration, the residue was dissolved with 100 ml. of anhydrous pyridine, and 20 g. of dicyclohexylcarbodiimide was added with stirring. Thereafter, the procedure similar to that in Example 1 was carried out, except that hydrogen type of Amberlite IR 120 cation exchange resin (trade name) was used instead of Dowex–50, and 5.2 g. (84% yield) of barium inosine-5'-phosphate (having 7.5 molecules of water of crystallization) was obtained.

Example 9

Benzylidenation and phosphorylation were carried out according to the procedure similar to that in Example 8, using 2.83 g. of guanosine, 50 ml. of benzaldehyde, 13 g. of p-nitrophenyl dihydrogen phosphate, 18 g. of 2,2-diethoxypropane, and 20 g. of dicyclohexylcarbodiimide. There was thus obtained 40 g. (60% yield) of barium guanosine-5'-phosphate (having 9 molecules of water of crystallization).

Example 10

Benzylidenation and dehydration by means of azeotropic distillation using anhydrous pyridine were performed according to the procedure similar to that in Example 8, using 2.83 g. of well-dried guanosine, 50 ml. of anhydrous benzaldehyde, and 13 g. of phenyl dihydrogen phosphate. The residue was dissolved with 100 ml. of anhydrous pyridine, and 36 g. of trichloroacetonitrile added with stirring. The mixture was heated at 65° C. for 5 hours and concentrated to dryness in vacuo. The phenyl radical attached to the phosphate radical through ester linkage was removed by catalytic hydrogenation using platinum catalyst. Dissolving in 1 liter of water, the pH of the solution was adjusted to 2.5 with sulfuric acid, and heated at 100° C. for 1 hour. After cooling, the pH was adjusted to 7.5 with barium hydroxide solution, followed by the same procedure as in Example 1. There was thus obtained 4.1 g. (62% yield) of barium guanosine-5'-phosphate.

Example 11

The suspension of 2.69 g. of adenosine in 50 ml. of benzaldehyde was well mixed with 13 g. of p-nitrophenyl dihydrogen phosphate and 18 g. of 2,2-diethoxypropane. With exclusion of external moisture, the mixture was heated at 70° C. for 10 hours with stirring. After cooling, 200 ml. of anhydrous pyridine was added and the mixture was dried in vacuo. In order to dehydrate the residue, the procedure in which the residue was dissolved with 100 ml. of anhydrous pyridine and dried in vacuo, was repeated 3 times. After the dehydration, the residue was dissolved with 100 ml. of anhydrous pyridine, 30 g. of dimethylcyanamide was added with stirring, and the mixture was left under anhydrous conditions at room temperature for 48 hours. A volume of 200 ml. of water was then added and the mixture was allowed to stand at room temperature for 1 hour, and concentrated to dryness in vacuo. Conc. ammonia water (75 ml.) was added, the mixture heated at 60° C. for 1 hour and filtered after cooling. Barium adenosine-5'-phosphate was obtained by the procedure similar to that in Example 1. Treatment with hydrogen-type of Diaion SK #1 cation exchange resin (trade name) aqueous solution of adenosine-5'-phosphoric acid (5'-adenylic acid). Drying in vacuo, 1.6 g. (42% yield) of adenosine-5'-phosphoric acid (having 2 molecules of water of crystallization) was obtained.

Example 12

The procedure similar to that in Example 10 gave barium uridine-5'-phosphate using 2.44 g. of well-dried uridine, 50 ml. of anhydrous benzaldehyde, 50 ml. of anhydrous dimethylformamide, and 10 g. of 2-cyanoethyl-dihydrogen phosphate as the starting materials, and 30 g. of N-methyl dimethyl keteneimide as the condensing agent in the phosphorylation step. Subsequently, the procedure similar to that in Example 5 gave aqueous solution of uridine-5'-phosphoric acid (5'-uridylic acid). The solution was neutralized with theoretical amount of 0.1 N sodium hydroxide solution and dried in vacuo. There was thus obtained 1.6 g. (40% yield) of disodium uridine-5'-phosphate (having 2 molecules of water of crystallization).

Example 13

The suspension of 2.83 g. of guanosine in 100 ml. of methyl ethyl ketone was well mixed with 50 ml. of dimethylformamide containing 10 g. of 2-cyanoethyl dihydrogen phosphate and 15 g. of 2,2-dimethoxybutane. With exclusion of external moisture, the mixture was refluxed 10 hours. After cooling, 100 ml. of anhydrous pyridine was added and the mixture was dried in vacuo. In order to dehydrate the residue, the procedure in which the residue was dissolved with 100 ml. of anhydrous pyridine and concentrated to dryness in vacuo, was repeated 3 times. After the dehydration, the residue was dissolved with 100 ml. of anhydrous pyridine, 20 g. of dicyclohexylcarbodiimide was added with stirring, and the mixture was left under anhydrous conditions at room temperature for 48 hours. A volume of 200 ml. of water was then added and the mixture was allowed to stand at room temperature for one hour and concentrated to dryness in vacuo. Following the procedure similar to that in Example 1, 5.3 g. (80% yield) of barium guanosine-5'-phosphate (having 9 molecules of water of crystallization) was thus obtained.

Example 14

The alkylidenation was carried out at 80° C. according to the same procedure as that in Example 13, using 2.67 g. of adenosine, 100 ml. of diethylketone, 100 ml. of ethanol, 15 g. of 2-cyanoethyl dihydrogen phosphate, and 20 g. of 2-ethoxypropylene. The same treatment as that in Example 3 except that 30 g. of trichloroacetonitrile was used instead of dicyclohexylcarbodiimide, gave 3.11 g. (83% yield) of adenosine-5'-phosphoric acid (having 2 molecules of water of crystallization).

Example 15

The alkylidenation was performed at 70° C. by the same procedure as that in Example 1, using 2.44 g. of uridine, 150 ml. of methyl isobutyl ketone, 15 g. of p-nitrophenyl dihydrogen phosphate, and 15 ml. of ethyl orthoacetate. The same procedure as that in Example 1, using 25 g. of dimethylcyanoamide instead of dicyclohexylcarbodiimide gave barium uridine - 5' - phosphate. Barium ion was removed by passing through a column of hydrogen-type of Dowex 50 to obtain an aqueous solution of the free acid, and the solution was converted into the disodium salt solution by adding aqueous sodium hydroxide solution and drying in vacuo. There was thus obtained 1.74 g. of disodium uridine-5'-phosphate (having 2 molecules of water of crystallization).

Example 16

The alkylidenation was carried out at 70° C. according to the same procedure as in Example 1, using 2.68 g. of inosine, 100 ml. of methyl n-octyl ketone, 100 ml. of ethanol, 15 g. of phenyl dihydrogen phosphate, and 10 g. of mesityl oxide. After phosphorylation according to the same procedure as in Example 1 using 15 g. of dicyclohexylcarbodiimide, phenyl radical attached to phosphate group through ester linkage was removed by catalytic hydrogenation using platinum or palladium catalyst rather than by alkaline hydrolysis. The 2',3'-O-alkylidine radical was removed by heating in HCl acidic solution, and the acidic solution was neutralized with calcium hydroxide. The precipitates thus deposited were filtered and washed several times with water to give 1 l. of combined filtrate and washings. Two volumes of ethanol was then added and the precipitates thus deposited were filtered. There was thus obtained 3.07 g. (61% yield) of calcium inosine-5'-phosphate (having 6.5 molecules of water of crystallization.

Example 17

The alkylidenation was performed by the same procedure as that in Example 1, using 2.83 g. of guanosine, 100 ml. of propionaldehyde, 15 g. of p-cyanophenyl dihydrogen phosphate, and 20 g. of acetal. Subsequently, the procedure similar to that in Example 1 using 15 g. of di-p-tolyl-carbodiimide gave 4.09 g. (62% yield) of barium guanosine-5'-phosphate.

Example 18

The same procedure as that in Example 3 using 2.43 g. of cytidine, 100 ml. of butyraldehyde, 100 ml. of ethanol, 10 g. of 2-nitroethyl dihydrogen phosphate, and 10 g. of propylene oxide as the starting materials, and 30 g. of N-methyl dimethyl keteneimide as the condensing agent in the phosphorylation step gave an aqueous solution of free cytidine-5'-phosphoric acid (5'-cytidylic acid), and the solution was dried in vacuo. There was thus obtained 1.52 g. (45% yield) of cytidine-5'-phosphoric acid (having one molecule of water of crystallization).

Example 19

The arylidenation was carried out at 70° C. by the same procedure as that in Example 1, using 2.69 g. of adenosine, 50 ml. of p-tolualdehyde, 50 ml. of dimethylformamide containing 10 g. of 2-cyanoethyl dihydrogen phosphate, and 15 g. of 2,2-diethoxypropane. The same procedure as that in Example 2 using 20 g. of dicyclohexylcarbodiimide gave 2.95 g. (78% yield) of adenosine-5'-phosphoric acid.

Example 20

The alkylidenation was done at 70° C. by the same procedure as that in Example 1, using 2.83 g. of well-dried guanosine, 50 ml. of anhydrous diethyl ketone, 50 ml. of anhydrous ethanol, and 10 g. of well-dried 2-cyanoethyl dihydrogen phosphate. Subsequently, 20 g. of triethylamine was added, the mixture dried in vacuo. The residue was dissolved with 100 ml. of anhydrous dimethylformamide and 20 g. of dicyclohexylcarbodiimide added with stirring. Afterwards, following the same procedure as that in Example 1, 4.86 g. (73% yield) of barium guanosine-5'-phosphate (having 9 molecules of water of crystallization) was obtained.

*Example 21*

The alkylidenation was performed at 80° C. by the same procedure as that in Example 1, using 2.54 g. of nicotinamide ribonucleoside, 100 ml. of methyl isobutyl ketone, 100 ml. of dimethylformamide containing 15 g. of 2-cyanoethyl dihydrogen phosphate. Subsequent treatment similar to that in Example 3 using 15 g. of dipropylcarbodiimide gave 2.32 g. (66% yield) of nicotinamide ribonucleoside-5'-phosphoric acid (having one molecule of water of crystallization).

*Example 22*

The alkylidenation was carried out at the refluxing temperature, according to the same procedure as that in Example 1, using 2.68 g. of inosine, 200 ml. of acetone, 15 g. of benzyl dihydrogen phosphate, 50 ml. of ethyl cellosolve, and 20 g. of ethyl orthoformate. The same procedure as that in Example 16 using 15 g. of di-p-tolylcarbodiimide gave 3.33 g. (66% yield) of calcium inosine-5'-phosphate (having 6.5 molecules of water of crystallization).

*Example 23*

Calcium nicotinamide ribonucleoside-5'-phosphate was obtained by the same procedure as in Example 22, using 2.54 g. of nicotinamide ribonucleoside, 100 ml. of acetone, 100 ml. of ethyl cellosolve, 17 g. of p-nitrobenzyl dihydrogen phosphate, and 20 g. of 2,2-diethoxypropane as the starting materials and 15 g. of dipropylcarbodiimide as the condensing agent in the phosphorylation step. Calcium ion was removed by the same procedure as that in Example 3, and the resulting solution was dried in vacuo. There was thus obtained 2.08 g. (59% yield) of nicotinamide ribonucleoside-5'-phosphoric acid (having one molecule of water of crystallization).

*Example 24*

By the same procedure as in Example 16, 3.18 g. (63% yield) of calcium inosine-5'-phosphate (having 6.5 molecules of water of crystallization) was obtained, using 2.68 g. of inosine, 100 ml. of benzaldehyde, 5 g. of benzyl dihydrogen phosphate, and 8 g. of phenylbenzoylacetylene as the starting materials, and 20 g. of trichloroacetonitrile as the condensing agent in the phosphorylation step.

*Example 25*

The isopropylidenation was performed by the same procedure as that in Example 1, using 2.67 g. of adenosine, 100 ml. of acetone, 10 g. of 2-propynyl dihydrogen phosphate, 25 ml. of acetonitrile (25 ml.), and 20 g. of acetal. Subsequently, 20 g. of tributylamine was added, the mixture dried in vacuo. The residue was dissolved with 100 ml. of anhydrous dimethylformamide and 15 g. of dicyclohexylcarbodiimide was added with stirring. Then, following the same procedure as that in Example 23, 2.41 g. (63% yield) of adenosine-5'-phosphoric acid (having 2 molecules of water of crystallization) was obtained.

*Example 26*

By the same procedure as that in Example 23, 2.27 g. (59% yield) of adenosine-5'-phosphoric acid (having 2 molecules of water of crystallization) was obtained, using 2.67 g. of adenosine, 100 ml. of diethyl ketone, 50 ml. of dimethylformamide containing 15 g. of propyl dihydrogen phosphate, and 15 g. of 2,2-diethoxypropane as the starting materials, and 20 g. of dicyclohexylcarbodiimide as the condensing agent in the phosphorylation step.

*Example 27*

An aqueous solution of uridine-5'-phosphoric acid was obtained by the same procedure as that in Example 23, using 2.44 g. of well-dried uridine, 150 ml. of anhydrous benzaldehyde, and 10 g. of well-dried p-nitrobenzyl dihydrogen phosphate as the starting materials, and 15 g. of dicyclohexylcarbodiimide as the condensing agent in the phosphorylation step. Subsequently, the solution was converted into disodium salt by adding sodium hydroxide solution and drying in vacuo. There was thus obtained 2.4 g. (60% yield) of disodium uridine-5'-phosphate (having 2 molecules of water of crystallization).

*Example 28*

Barium cytidine-5'-phosphate was obtained from 2.43 g. of cytidine, 100 ml. of p-tolualdehyde, 50 ml. of dimethylformamide, and 10 g. of 2-propynyl dihydrogen phosphate as the starting materials, 10 g. of benzalacetone, and 25 g. of dimethylcyanamide as the condensing agent in the phosphorylation step by the same procedure as that in Example 16, except that barium hydroxide was used instead of calcium hydroxide. Further treatment similar to that in Example 14 gave 2.11 g. (62% yield) of cytidine-5'-phosphoric acid (having one molecule of water of crystallization).

*Example 29*

By the same procedure as in Example 16, 3.07 g. of calcium inosine-5'-phosphate was obtained, using 2.68 g. of inosine, 100 ml. of cyclopentanone, 100 ml. of ethanol, 15 g. of cyclohexyl dihydrogen phosphate, and 10 g. of 2,2-dimethoxypropane as the starting materials, and 15 g. of dicyclohexylcarbodiimide as the condensing agent in the phosphorylation step.

*Example 30*

By the same procedure as that in Example 28, 2.03 g. of cytidine-5'-phosphoric acid was obtained from 2.43 g. of cytidine, 100 ml. of cyclobutyl methyl ketone, 15 g. of cyclobutylmethyl dihydrogen phosphate, 50 ml. of acetonitrile, and 10 g. of 2,2-dimethoxypropane as the starting materials, and 15 g. of di-p-tolylcarbodiimide as the condensing agent in the phosphorylation step.

*Example 31*

By the same procedure as in Example 28, 2.38 g. of adenosine-5'-phosphoric acid was obtained from 2.67 g. of adenosine, 100 ml. of phenylacetaldehyde, 15 g. of p-cresyl dihydrogen phosphate, 20 g. of acetal, and 50 ml. of ethyl cellosolve as the starting materials and 20 g. of dicyclohexylcarbodiimide as the condensing agent in the phosphorylation step.

*Example 32*

By the same procedure as that of Example 25, 2.24 g. of adenosine-5'-phosphoric acid was obtained from 2.67 g. of well-dried adenosine, 100 ml. of anhydrous acetone, and 20 g. of well-dried p-ethylphenyl dihydrogen phosphate as the starting materials, and 15 g. of dicyclohexylcarbodiimide as the condensing agent in the phosphorylation step.

*Example 33*

Inosine (2.68 g.), 100 ml. of chloroacetone, 50 ml. of dimethylformamide, 15 g. of O-carboxyphenyl dihydrogen phosphate, and 15 g. of 2,2-diethoxypropane were heated at 80° C. for 10 hours with stirring to perform the 2',3'-substitution reaction. The mixture was dehydrated by azeotropic distillation using anhydrous pyridine. The residue was then dissolve with 100 ml. of anhydrous N-methyl piperidine, and 15 g. of dicyclohexylcarbodiimide was added with stirring. After 24 hours standing at room temperature, 500 ml. of water was added, and the mixture was allowed to stand for 1 hour. The pH of the mixture was adjusted to 2 with hydrochloric acid, and the mixture was heated at 100° C. for 1 hour. After cooling, the pH was adjusted to 4 with calcium hydroxide, and concentrated to 500 ml. in vacuo. The pH of the concentrate was adjusted to 7.5 with calcium hydroxide, and the precipitates thus deposited were filtered and washed several times with water. To the combined filtrate and washings was added 2 volumes of ethanol to produce the precipitates of calcium inosine-5'-phosphate. Calcium ion was removed by passing through a column of hydrogen type of Diaion SK #1 to give the free acid solution, and the solution was converted into the disodium salt solution by adding aqueous sodium hydroxide solution and drying in vacuo. There was thus obtained 3.47 g. of disodium inosine-5'-phosphate (having 7.5 molecules of water of crystallization).

*Example 34*

To 200 ml. of acetone, 3.07 g. of phosphorus oxychloride, 2.68 g. of well-dried inosine, and 10.4 g. of 2,2-dimethoxypropane were gradually added in order with stirring. After stirring the mixture at 20° C. for 5 hours with exclusion of external moisture, acetone and 2,2-dimethoxypropane were distilled off in vacuo, and 30 ml. of anhydrous pyridine was gradually added to the residue while the temperature was maintained at about −10° C. After 24 hours, 200 ml. of water was added, the mixture allowed to stand for 1 hour at room temperature, and then dried in vacuo. The residue was dissolved in 500 ml. of water and the solution was adjusted to pH 7.5 with aqueous hydroxide. The precipitates thus deposited were filtered, and washed several times with water. The combined filtrate and washings were passed through a column (4 cm. in diameter) packed with 500 ml. of hydrogen type of Dowex-50 (trade name) and the resin was thoroughly washed with water. All the effluents were allowed to stand at room temperature for 3 hours, adjusted to pH 7.5 with barium hydroxide, and filtered. Two volumes of ethanol was added into the filtrate and the precipitates thus formed were filtered and dried after washing with ethanol. There was thus obtained 5.0 g. (81% yield) of barium inosine-5'-phosphate (having 7.5 molecules of water of crystallization).

*Example 35*

Barium adenosine-5'-phosphate was obtained by the same procedure as that in Example 34, using 2.67 g. of well-dried adenosine, 400 ml. of anhydrous acetone, 1.8 g. of phosphorus oxychloride, and 50 ml. of anhydrous pyridine. Barium ion was removed from the barium salt by the usual way using hydrogen type of Dowex-50 (trade name) to give the free acid solution, and the solution was concentrated to dryness in vacuo. There was thus obtained 3.05 g. (80% yield) of adenosine-5'-phosphoric acid (having 2 molecules of water of crystallization).

*Example 36*

The isopropylidenation was carried out by the same procedure as that in Example 34, using 2.83 g. of guanosine, 200 ml. of acetone, 4.3 g. of phosphorus oxybromide (dissolved in 20 ml. of chloroform), and 10 g. of 2,2-dimethoxypropane. Subsequent treatment similar to that in Example 34 using 30 ml. of pyridine, gave 5.4 g. (82% yield) of barium guanosine-5'-phosphate (having 9 molecules of water of crystallization).

*Example 37*

The procedure similar to that in Example 34 was repeated using 2.44 g. of uridine, 100 ml. of acetone, 2.5 g. of phosphorus pentachloride, 20 g. of acetal, and 100 ml. of pyridine. The effluent from Dowex-50 was allowed to stand at room temperature for 3 hours, neutralized with sodium hydroxide solution to give the disodium salt solution and dried in vacuo. There was thus obtained 3.03 g. (75% yield) of disodium uridine-5'-phosphate (having 2 molecules of water of crystallization).

*Example 38*

The isopropylidenation was carried out by the same procedure as that in Example 34, using 2.67 g. of adenosine, 400 ml. of acetone, 1.8 g. of phosphorus oxychloride, and 13 g. of 2,2-diethoxypropane. Acetone and 2,2-diethoxypropane were distilled off in vacuo, and the residue was dissolved with 50 ml. of anhydrous dimethylformamide. While the solution was maintained at about −10° C., 20 g. of anhydrous triethylamine was gradually added with stirring. After standing for 24 hours at −10° C., the treatment similar to that in Example 35 was followed to obtain 2.97 g. (78% yield) of adenosine-5'-phosphoric acid.

*Example 39*

Using 2.67 g. of adenosine, 200 ml. of acetone, 1.8 g. of phosphorus oxychloride, 15 g. of ethyl orthoformate, 100 ml. of dimethylformamide, and 20 g. of tributylamine, 3.1 g. (81% yield) of adenosine-5'-phosphoric acid was obtained by the same procedure as in Example 38.

*Example 40*

Using 2.67 g. of adenosine, 100 ml. of acetone, 1.8 g. of phosphorus oxychloride, 7 g. of 2-methoxypropylene, 100 ml. of dimethylformamide, and 20 g. of tributylamine, 2.9 g. (76% yield) of adenosine-5'-phosphoric acid was obtained by the same procedure as that in Example 38.

*Example 41*

Using 2.67 g. of adenosine, 400 ml. of acetone, 1.8 g. of phosphorus oxychloride, 4.5 g. of ethylene oxide, and 30 ml. of pyridine 2.8 g. (73% yield) of adenosine-5'-phosphoric acid was obtained by the same procedure as in Example 35.

*Example 42*

By the same procedure as in Example 35, 3.1 g. (81% yield) of adenosine-5'-phosphoric acid was obtained, using 2.67 g. of adenosine, 400 ml. of acetone, 1.8 g. of phosphorus oxychloride, 50 ml. of anhydrous pyridine, and 10 g. of mestityloxide.

*Example 43*

Well-dried inosine (2.68 g.) was added to 50 ml. of anhydrous acetone cooled at −30° C. With stirring, 14 ml. of pyrophosphoryl chloride ($P_2O_3Cl_4$) was added dropwise. After stirring at about −30° for 10 hours, the temperature of the mixture was adjusted to 20° C., and the mixture kept for 30 min. to carry out phosphorylation. Then, 750 ml. of ether was added, the mixture was allowed to stand for 1 hour. The resulting precipitates were filtered, washed with anhydrous ether and dissolved in 500 ml. of cold water. The solution was adjusted to pH 1.0 with aqueous barium hydroxide, and allowed to stand at 20° C. for 48 hours to carry out the deisopropylidenation. The pH was adjusted to 7.5 with barium hydroxide, and the resulting precipitates were filtered, and washed several times with water. The combined filtrate and washings were treated by the same procedure as in Example 34. There was thus obtained 5.5 g. (89% yield) of barium inosine-5'-phosphate.

*Example 44*

A suspension of 2.44 g. of uridine, in 200 ml. of acetone was mixed with 11.5 g. of polyphosphoric acid prepared from 5 g. of orthophosphoric acid and 6.5 g. of phosphorus pentoxide, and 10 g. of 2,2-dimethoxypropane, and the mixture was refluxed for 5 hours to carry out the isopropylidenation of uridine. The solvent was then distilled off, the residue kept at 60° C. for 2 hours, 100 ml. of cold water added, and the resulting clear solution was heated at 100° C. for 1.5 hours. It was neutralized with 1.0 N lithium hydroxide solution to pH 9 and the precipitate of lithium phophate was filtered, and washed twice with water. The combined filtrate and washings were concentrated under reduced pressure to 25 ml. and the resulting lithium phophate was filtered. The filtrate was adsorbed on a Dowex-2 ion-exchange resin (200-235 mesh, chloride form) column (7 cm. in length x 4 cm. in diameter), and the column washed with water until the optical density of the effluent fell below 0.05. After uridine was removed in such a way, 0.05 N hydrochloric acid was passed through the column. The eluate was adjusted to pH 1.0 with hydrochloric acid, allowed to stand for 3 hours. After adjusting the pH to 7.5 with calcium hydroxide, the solution was concentrated under reduced pressure to being syrupy. Alcohol was added to the syrupy residue, and the precipitates formed were filtered, washed with alcohol, and dried. There was thus obtained 3.57 g. (79% yield) of calcium uridine-5'-phosphate (having 2 molecules of water of crystallization). Furthermore, uridine diphosphate was eluted from the column with 0.015 N HCl+0.1 N calcium chloride solution and the eluate was treated as described above to remove the isopropylidene radical. The solution was adjusted to pH 7.5 with calcium hydroxide, and concentrated to become a syrupy residue. Alcohol was added to the residue, and the precipitates were filtered, washed with alcohol, and dried. There was thus obtained 0.4 g. (7% yield) of calcium uridine diphosphate.

*Example 45*

The isopropylidenation was performed by the same procedure as that in Example 44, using 2.67 g. of adenosine, 200 ml. of acetone (200 ml.), 11.5 g. of polyphosphoric acid having the same composition as in Example 44, and 20 g. of ethyl orthoformate. The solvent was distilled off under reduced pressure, 50 ml. of anhydrous pyridine was added to the residue, and then a solution of 40 g. of N,N'-dicyclohexyl-carbodiimide (DDC) in 50 ml. of anhydrous pyridine was added dropwise. The mixture was allowed to stand at 40° C. for 40 hours, and 100 ml. of water was added. The mixture was allowed to stand at ordinary temperature for 1 hour, and dried under reduced pressure. The residue was dissolved in 500 ml. of water, and the solution was adjusted to pH 7.5 with aqueous barium hydroxide. The resulting precipitates were filtered, and washed several times with water. The combined filtrate and washings were passed through a column (4 cm. in diameter) packed with 500 ml. of hydrogen form of Dowex-50 (trade name) and the resin was thoroughly washed with water. The effluent was concentrated to dryness under reduced pressure to give 2.7 g. (71% yield) of adenosine-5'-phosphoric acid.

*Example 46*

The isopropylidenation was carried out by the same procedure as in Example 34, using 2.67 g. of adenosine, 10 g. of 2-methoxypropylene, 400 ml. of acetone, and 11.5 g. of polyphosphoric acid. The subsequent treatment similar to that in Example 45 using 100 ml. of pyridine and 30 g. of dimethylcyanamide gave 1.7 g. (45% yield) of adenosine-5'phosphoric acid.

*Example 47*

The isopropylidenation was carried out by the same procedure as in Example 34, using 2.67 g. of adenosine, 8 g. of metaphosphoric acid, 200 ml. of ethyl alcohol, 400 ml. of acetone and 20 g. of 2,2-diethoxypropane. The subsequent procedure similar to that in Example 45 using 100 ml. of pyridine and 30 g. of N-methyl dimethyl ketenimide gave 1.1 g. (29% yield) of adenosine-5'-phosphoric acid.

*Example 48*

By the same procedure as in Example 46, using 2.67 g. of adenosine, 400 ml. of acetone, 200 ml. of ethyl alcohol, 8 g. of metaphosphoric acid, 10 g. of 2,2-diethoxypropane, 80 ml. of pyridine, and 40 g. of N,N-dicyclohexylcarbodiimide (40 g.), 1.8 g. (47% yield) of adenosine-5'-phosphoric acid was obtained.

*Example 49*

By the same procedure as in Example 46, using 2.67 g. of adenosine, 200 ml. of acetone, 11.5 g. of polyphosphoric acid, 10 g. of 2,2-dimethoxypropane, 100 ml. of pyridine, and 36 g. of trichloroacetonitrile, 2.4 g. (63% yield) of adenosine-5'-phosphoric acid was obtained.

*Example 50*

The same procedure as in Example 34, using 200 ml. of diethyl ketone, 20 ml. of chloroform containing 4.3 g. of phosphorus oxybromide, 2.68 g. inosine, 15 g. of 2,2-diethoxypentane, and 30 ml. of anhydrous pyridine gave 4.89 g. (78% yield) of barium inosine-5'-phosphate.

*Example 51*

The same procedure as in Example 35 using 2.67 g. of well-dried adenosine, 200 ml. of anhydrous methyl ethyl ketone, 2 g. of phosporus oxychloride and 50 ml. of anhydrous pyridine gave 3.17 g. (80% yield) of adenosine-5'-phosphoric acid.

*Example 52*

The same procedure as in Example 37, using 2.68 g. of well-dried inosine, 100 ml. of anhydrous methyl butyl ketone, 2.5 g. of phosphorus pentachloride, and 100 ml. of pyridine gave 3.37 g. (80% yield) of disodium inosine-5'-phosphate (having 7.5 molecules of water of crystallization).

*Example 53*

By the same procedure as that in Example 44, 2.63 g. (66% yield) of calcium uridine-5'-phosphate (having 2 molecules of water of crystallization) was obtained using 200 ml. of anhydrous butyraldehyde, 5 g. of 99.5% orthophosphoric acid, and 2.44 g. of well-dried uridine.

*Example 54*

Using 200 ml. of acetaldehyde (200 ml.), 3 g. of phosphorus oxychloride, 2.83 g. of guanosine, 20 g. of acetal, 4.18 g. (63% yield) of barium guanosine-5'-phosphate was obtained by the same procedure as in Example 34.

*Example 55*

Using 200 ml. of propionaldehyde, 5 g. of pyrophosphoric acid, 2.43 g. of cytidine, 20 g. of ethyl orthopropionate, 50 ml. of pyridine and 30 g. of DCC, 2.31 g. (68% yield) of cytidine-5'-phosphoric acid (having one molecule of water of crystallization) was obtained by the same procedure as in Example 45.

*Example 56*

Barium adenosine-5'-phosphate was obtained by the same procedure as that in Example 43, using 200 ml. of anhydrous methyl octyl ketone, 10 ml. of pyrophosphoryl chloride ($P_2O_3Cl_4$), and 2.67 g. of well-dried adenosine. After the removal of barium ion by treatment with hydrogen form of Diaion SK #1 cation exchange resin, 2.86 g. (75% yield) of adenosine-5'-phosphoric acid was isolated as in Example 35.

*Example 57*

The isopropylidenation was carried out at 50° C. by the same procedure as that in Example 34, using 200 ml. of acetone, 100 ml. of anhydrous ethanol containing 10 g. of metaphosphoric acid, 10 g. of 2,2-dimethoxypropane, and 3.54 g. of nicotinamide ribonucleoside. Subsequent procedure similar to that in Example 45, using 100 ml. of anhydrous pyridine and 30 g. of DCC gave 2.54 g. (72% yield) of nicotinamide ribonucleoside-5'-phosphoric acid.

*Example 58*

Using 100 ml. of anhydrous benzaldehyde, 100 ml. of anhydrous ethanol, 8 g. of metaphosphoric acid, 2.67 g. of well-dried adenosine, 100 ml. of anhydrous pyridine and 40 g. of DCC, 2.98 g. (78% yield) of adenosine-5'-phosphoric acid was obtained by the same procedure as that in Example 57.

Example 59

Using 200 ml. of anhydrous chloroacetone, 3 g. of phosphorus oxychloride, 2.68 g. of well-dried inosine, and 100 ml. of anhydrous pyridine, 3.9 g. (63% yield) of barium inosine-5'-phosphate was obtained by the same procedure as that in Example 34.

Example 60

The alkylidenation was performed at 70° C. by the same procedure as that in Example 44, using 200 ml. of anhydrous diacetone alcohol, 5 g. of pyrophosphoric acid, 50 ml. of ethyl Cellosolve, and 2.44 g. of uridine. Subsequent procedure similar to that in Example 44, using 100 ml. of pyridine and 40 g. of DCC, gave 2.42 g. (61% yield) of calcium uridine-5'-phosphate.

Example 61

Using 100 ml. of anhydrous mesityl oxide, 2.67 g. of well-dried adenosine, 3 g. of phosphorus oxychloride, and 50 ml. of anhydrous pyridine, 2.27 g. (59% yield) of adenosine-5'-phosphoric acid was obtained by the same procedure as that in Example 35.

Example 62

The arylalkylidenation was performed at 80° C. by the same procedure as that in Example 45, using 100 ml. of anhydrous phenylacetaldehyde, 50 ml. of anhydrous dimethylformamide, 5 g. of pyrophosphoric acid, and 2.67 g. of well-dried adenosine. Further treatment similar to that in Example 45, using 100 ml. of anhydrous pyridine and 30 g. of di-p-tolylcarbodiimide gave 1.51 g. (39% yield) of adenosine-5'-phosphoric acid.

Example 63

The cyclohexylidenation was carried out at 80° C. according to the procedure similar to that described in Example 45, using 100 ml. of anhydrous cyclohexanone, 5 g. of pyrophosphoric acid, 50 ml. of well-dried ethyl Cellosolve, and 2.67 g. of well-dried adenosine. Further treatment similar to that in Example 45, using 100 ml. of anhydrous pyridine and 40 g. of DCC gave 1.58 g. (41% yield) of adenosine-5'-phosphoric acid.

Example 64

The isopropylidenation was carried out by the same procedure as in Example 34, using 2.68 g. of inosine, 200 ml. of acetone, 2.5 g. of dichlorophosphoric acid, and 10 g. of 2,2-dimethoxypropane. The subsequent treatment similar to that in Example 34, using 30 ml. of anhydrous pyridine gave 4.9 g. of barium inosine-5'-phosphate.

Example 65

Using 2.67 g. of well-dried adenosine, 400 ml. of anhydrous acetone, 3.2 g. of bromophosphoric acid, and 50 ml. of anhydrous pyridine, 3.0 g. of adenosine-5'-phosphoric acid (3.0 g.) was obtained by the same procedure as that in Example 35.

Example 66

The isopropylidenation was carried out by the same procedure as in Example 34, using 2.83 g. of guanosine, 200 ml. of acetone, 2.3 g. of chlorophosphoric acid, and 10 g. of ethyl orthoformate. The subsequent procedure similar to that in Example 36, using 30 ml. of anhydrous pyridine gave 5.3 g. of barium guanosine-5'-phosphate.

Example 67

The isopropylidenation was carried out by the same procedure as in Example 34, using 2.44 g. of uridine, 200 ml. of acetone, 4.5 g. of dibromophosphoric acid (in the form of a solution in 50 ml. of chloroform), and 10 g. of 2,2-diethoxypropane. Thereafter, the solvent was removed by distillation under reduced pressure, and the residue was dissolved with 100 ml. of anhydrous dimethyl formamide. The procedure similar to that in Example 37 was repeated using 20 g. of anhydrous triethylamine instead of pyridine to give 3.1 g. of disodium uridine-5'-phosphate.

Example 68

The isopropylidenation was performed by the same procedure as in Example 34, using 2.67 g. of adenosine, 200 ml. of acetone, 3.0 g. of monochloropyrophosphoric acid, and 10 g. of acetal. Afterwards, the solvent was removed by distillation under reduced pressure, and the residue was dissolved with 100 ml. of dimethylformamide. The subsequent procedure similar to that in Example 35, using 20 g. of anhydrous tripropylamine gave 2.9 g. of adenosine-5'-phosphoric acid.

Example 69

The isopropylidenation was carried out by the procedure similar to that in Example 34, using 2.67 g. of adenosine, 100 ml. of acetone, 5.5 g. of triphosphoryl chloride, and 10 g. of 2-methoxypropylene. The subsequent procedure similar to that in Example 68, using 100 ml. of dimethylformamide and 20 g. of tributylamine gave 2.8 g. of adenosine-5'-phosphoric acid.

Example 70

By the procedure similar to that in Example 41, using 2.67 g. of adenosine, 400 ml. of acetone, 5 g. of dichloropyrophosphoric acid, 4.5 g. of ethylene oxide, and 50 ml. of pyridine, 2.9 g. of adenosine-5'-phosphoric acid was obtained.

Example 71

By the procedure similar to that in Example 35, using 2.67 g. of adenosine, 400 ml. of acetone, 5.5 g. of monochlorotetraphosphoric acid, and 100 ml. of anhydrous pyridine, 2.7 g. of adenosine-5'-phosphoric acid was obtained.

Example 72

By the procedure similar to that in Example 34, using 2.68 g. of inosine, 200 ml. of diethylketone, 6.0 g. of dichlorotetraphosphoric acid, 15 g. of 2,2-diethoxypentane, and 100 ml. of anhydrous pyridine, 4.9 g. of barium inosine-5'-phosphate was obtained.

Example 73

Using 2.68 g. of well-dried inosine, 100 ml. of anhydrous methylbutylketone, a mixture of 4.5 g. of polyphosphoric acid (prepared from 2 g. of orthophosphoric acid and 2.5 g. of phosphorus pentoxide) and 2.5 g. of phosphorus oxychloride, and 100 ml. of pyridine, 3.4 g. of disodium inosine-5'-phosphate was obtained by the procedure similar to that in Example 37.

Example 74

By the procedure similar to that in Example 35, using 2.67 g. of well-dried adenosine, 200 ml. of anhydrous methyl ethyl ketone, 2.5 g. of dichlorophosphoric acid, and 100 ml. of anhydrous N-methylpiperidine, 3.2 g. of adenosine-5'-phosphoric acid was obtained.

Example 75

By the same procedure as in Example 67, using 2.44 g. of well-dried uridine, 200 ml. of anhydrous butyraldehyde, a mixture of 2.5 g. of pyrophosphoric acid and 3.5 g. of phosphorus oxychloride, 50 ml. of anhydrous dimethylformamide, and 50 ml. of anhydrous morpholine, 2.9 g. of disodium uridine-5'-phosphate was obtained.

Example 76

Using 2.83 g. of guanosine, 200 ml. of acetaldehyde, 20 g. of acetal, and a mixture of 2.0 g. of phosphorus pentoxide and 2.5 g. of phosphorus oxychloride, 4.2 g. of barium guanosine-5'-phosphate was obtained by the procedure similar to that in Example 43.

Example 77

Using 2.43 g. of cytidine, 200 ml. of propionaldehyde, a mixture of 2.5 g. of phosphorus pentoxide and 3.4 g. of dichlorophosphoric acid, 20 g. of ethyl orthorpropionate, and 100 ml. of anhydrous N-methylpyrrole, 2.3 g. of cytidine-5'-phosphoric acid was obtained according to the procedure similar to that in Example 65.

Example 78

Using 3.54 g. of nicotinamide ribonucleoside, 200 ml. of acetone, 100 ml. of anhydrous ethanol, a mixture of 2 g. of phosphorus pentoxide and 3 g. of monochlorophosphoric acid, and 10 g. of 2,2-dimethoxypropane, 2.6 g. of nicotinamide ribonucleoside-5'-phosphoric acid was obtained by the procedure similar to that in Example 65.

Example 79

Using 2.67 g. of adenosine, 100 ml. of anhydrous benzaldehyde, 100 ml. of anhydrous ethanol, a mixture of 1.5 g. of pyrophosphoric acid and 2 g. of dichlorophosphoric acid and 100 ml. of anhydrous pyridine, 2.7 g. of adenosine-5'-phosphoric acid was obtained by the procedure similar to that in Example 65.

Example 80

Using 2.68 g. of well-dried inosine, 200 ml. of anhydrous chloroacetone, a mixture of 1.4 g. of dichlorophosphoric acid and 1.2 g. of monochlorophosphoric acid, and 100 ml. of anhydrous pyridine, 4.0 g. of barium inosine-5'-phosphate was obtained by the procedure similar to that in Example 64.

Example 81

Using 2.44 g. of uridine, 200 ml. of anhydrous diacetone alcohol, 100 ml. of ethyl Cellosolve, 4 g. of dichlorophosphoric acid, and 100 ml. of pyridine, 2.7 g. of barium uridine-5'-phosphate was obtained by the procedure similar to that in Example 64.

Example 82

Using 2.67 g. of adenosine, 100 ml. of acetone, a mixture of 2.0 g. of phosphorus pentachloride and 5.0 g. of metaphosphoric acid, and 100 ml. of anhydrous pyridine, 2.8 g. of adenosine-5'-phosphoric acid was obtained by the procedure similar to that in Example 65.

What we claim is:

1. In a process for preparing 2',3'-O-substituted ribonucleoside by reacting the corresponding 2'-OH,3'-OH ribonucleoside with carbonyl compound in the presence of a catalyst, the improvement according to which the catalyst is concurrently catalyst for the condensation reaction involving the carbonyl compound and phosphorylating agent for the phosphorlyation of the 2',3'-O-substituted ribonucleoside resulting from said condensation, whereby isolation of the last-named nucleoside and separation of catalyst from the reaction mixture are rendered superfluous as a step antecedent to phosphorylation of the said nucleoside.

2. The improvement according to claim 1, wherein the phosphorylating agent is monoester of phosphoric acid.

3. The improvement according to claim 1, wherein the concurrent catalyst and phosphorylating agent is a member selected from the group consisting of metaphosphoric acid, orthophosphoric acid and phosphorus pentoxide.

4. The improvement according to claim 1, wherein the concurrent catalyst and phosphorylating agent is a member selected from the group consisting of compounds of the formulae

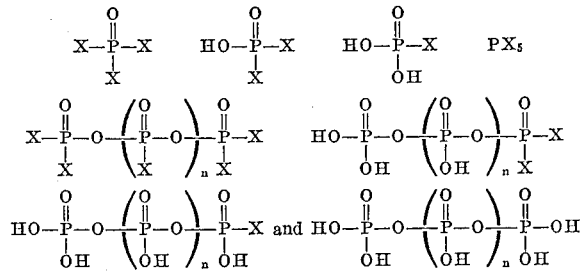

wherein X stands for a halogen atom with an atomic weight from about 35 to about 80 inclusive, and $n$ is a numeral from 0 to 3 inclusive.

5. The improvement according to claim 1 wherein at least one auxiliary agent selected from the group consisting of condensing agents, organic bases, solvents and dehydrating agents are included in the reaction mixture.

6. The improvement according to claim 1 for the preparation of guanosine-5'-phosphoric acid from guanosine, wherein the carbonyl compound is acetone and the concurrent catalyst and phosphorylating agent is 2-cyanoethyl dihydrogen phosphate.

7. The improvement according to claim 1 for the preparation of inosine-5'-phosphoric acid from inosine, wherein the carbonyl compound is acetone and the concurrent catalyst and phosphorylating agent is p-cyanophenyl dihydrogen phosphate.

8. The improvement according to claim 1 for the preparation of adenosine-5'-phosphoric acid from adenosine, wherein the carbonyl compound is acetone and the concurrent catalyst and phosphorylating agent is 2-cyanoethyl dihydrogen phosphate.

9. The improvement according to claim 1 for the preparation of uridine-5'-phosphoric acid from uridine, wherein the carbonyl compound is acetone and the concurrent catalyst and phosphorylating agent is p-nitrophenyl dihydrogen phosphate.

10. The improvement according to claim 1 for the preparation of cytidine-5'-phosphoric acid from cytidine, wherein the carbonyl compound is acetone and the concurrent catalyst and phosphorylating agent is 2-cyanoethyl dihydrogen phosphate.

11. The improvement according to claim 1 for the preparation of inosine-5'-phosphoric acid from inosine, wherein the carbonyl compound is benzaldehyde and the concurrent catalyst and phosphorylating agent is 2-cyanoethyl dihydrogen phosphate.

12. The improvement according to claim 1 for the preparation of guanisine-5'-phosphoric acid from guanosine, wherein the carbonyl compound is methyl ethyl ketone and the concurrent catalyst and phosphorlyating agent is 2-cyano dihydrogen phosphate.

13. The improvement according to claim 1 for the preparation of inosine-5'-phosphoric acid from inosine, wherein the carbonyl compound is acetone and the concurrent catalyst and phosphorylating agent is phosphorus oxychloride.

14. The improvement according to claim 1 for the preparation of guanosine-5'-phosphoric acid from guanosine, wherein the carbonyl compound is acetone and the concurrent catalyst and phosphorylating agent is phosphorus oxybromide.

15. The improvement according to claim 1 for the preparation of inosine-5'-phosphoric acid from inosine wherein the carbonyl compound is acetone and the concurrent catalyst and phosphorylating agent is pyrophosphoryl chloride.

16. The improvement according to claim 1 for the preparation of uridine-5'-phosphoric acid from uridine, wherein the carbonyl compound is butyraldehyde and the concurrent catalyst and phosphorylating agent is orthophosphoric acid.

17. The improvement according to claim 1 for the preparation of adenosine-5'-phosphoric acid from adenosine, wherein the carbonyl compound is acetone and the concurrent catalyst and phosphorylating agent is triphosphoryl chloride.

18. The improvement according to claim 1 for the preparation of adenosine-5'-phosphoric acid from adenosine, wherein the carbonyl compound is phenylacetaldehyde and the concurrent catalyst and phosphorylating agent is pyrophosphoric acid.

19. The improvement according to claim 1 for the preparation of adenosine-5'-phosphoric acid from adenosine, wherein the carbonyl compound is cyclohexanone and the concurrent catalyst and phosphorylating agent is pyrophosphoric acid.

References Cited by the Examiner
UNITED STATES PATENTS

| | | | |
|---|---|---|---|
| 2,482,069 | 9/49 | Ruskin | 260—211.5 |
| 2,549,827 | 4/51 | Laufer et al. | 260—211.5 |
| 2,624,732 | 1/53 | Hitchings et al. | 260—211.5 |

OTHER REFERENCES

Khorana: "Some Recent Developments in the Chemistry of Phosphate Esters of Biological Interest," John Wiley and Sons, Inc., New York, 1961, pp. 24–40.

LEWIS GOTTS, *Primary Examiner.*